United States Patent [19]

Clark, Jr. et al.

[11] 4,038,655
[45] July 26, 1977

[54] RADAR CONTOUR EDGE RESTORE CIRCUIT

[75] Inventors: Charles Albert Clark, Jr., Chatsworth; Roy Atsushi Ito, Woodland Hills, both of Calif.

[73] Assignee: RCA Corporation, New York, N.Y.

[21] Appl. No.: 695,984

[22] Filed: June 14, 1976

[51] Int. Cl.² ............................................. G01S 9/60
[52] U.S. Cl. .................................................. 343/5 W
[58] Field of Search ....................................... 343/5 W

[56] References Cited

U.S. PATENT DOCUMENTS

| 2,786,993 | 3/1957 | Reid | 343/5 W |
| 2,994,079 | 7/1961 | Obloy et al. | 343/5 W X |
| 3,366,951 | 1/1968 | Lhermitte et al. | 343/5 W |
| 3,447,153 | 5/1969 | Maguire | 343/5 W |

FOREIGN PATENT DOCUMENTS 2,223,242  11/1973  Germany .............................. 343/5 W

*Primary Examiner*—T.H. Tubbesing
*Attorney, Agent, or Firm*—H. Christoffersen; Joseph D. Lazar; Raymond E. Smiley

[57] ABSTRACT

Contour correction circuitry is provided for use in a weather radar which has iso-contour circuitry and which has a digital display having a tendency to undesirably not display the trailing edge boundary, for example, of a storm cloud. The correction circuitry is responsive to even a momentary signal indicating the close of a contour for forcing a contour boundary to appear on the digital display. The correction circuitry also enhances the texture of the radar when displaying snow flurries, ground returns, etc. which exhibit unique pattern characteristics.

4 Claims, 10 Drawing Figures

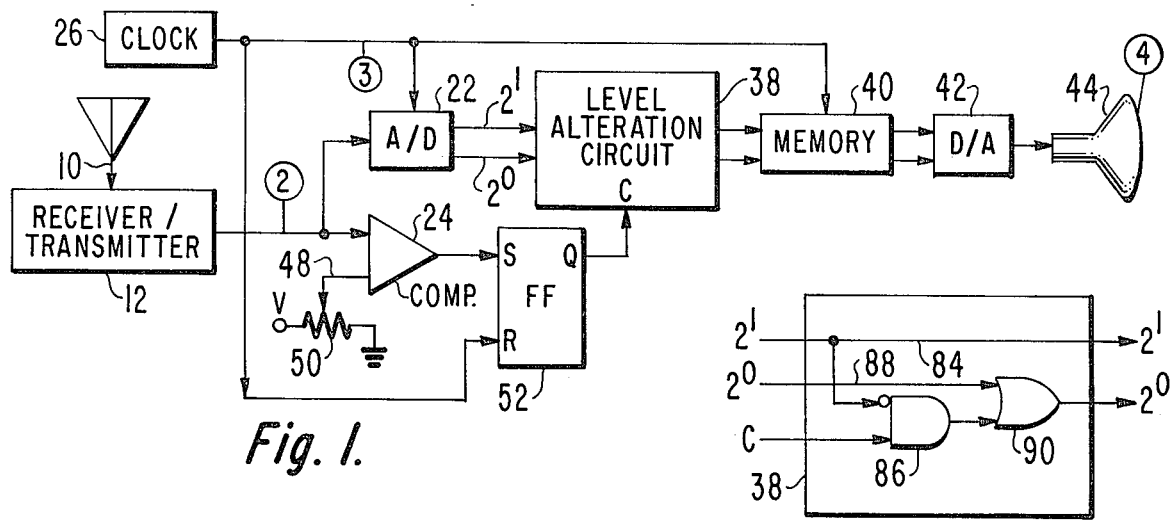
Fig. 1.
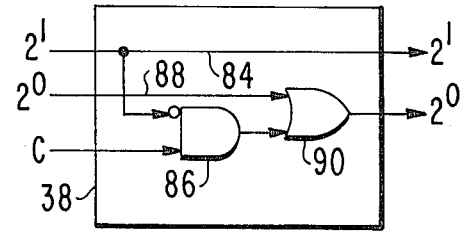
Fig. 5.
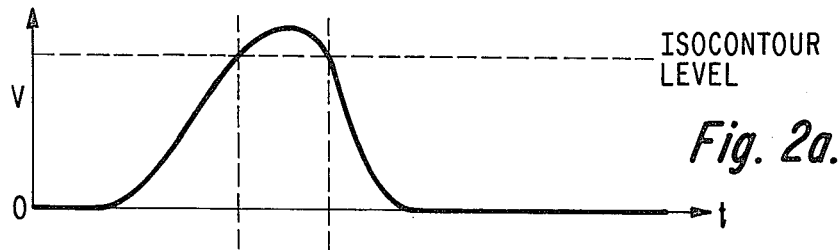
Fig. 2a.
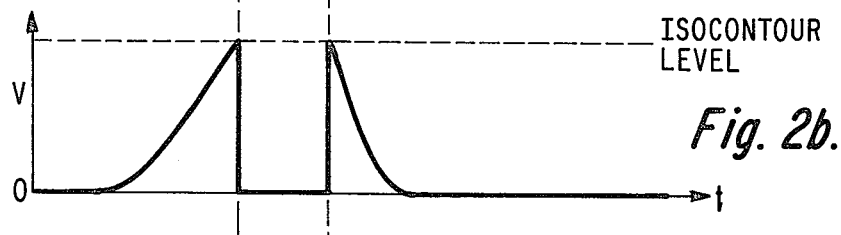
Fig. 2b.
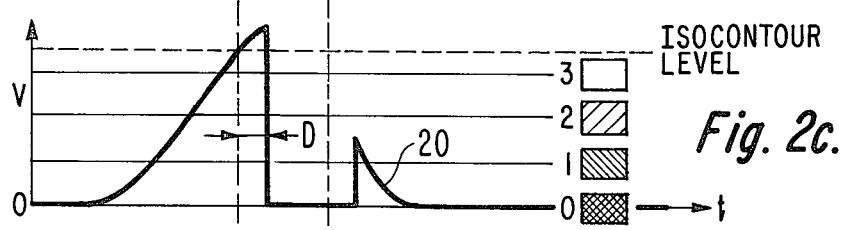
Fig. 2c.
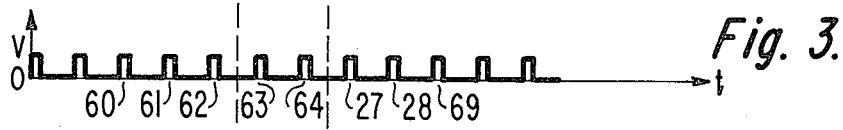
Fig. 3.
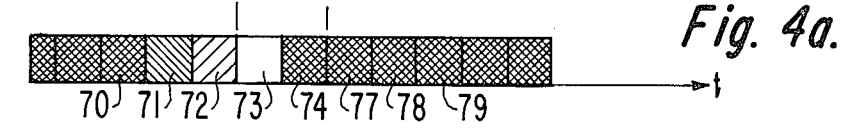
Fig. 4a.
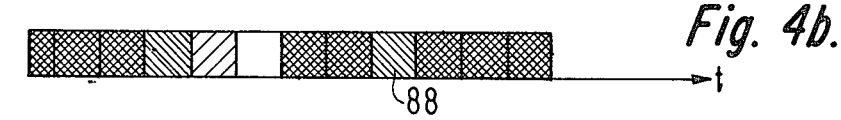
Fig. 4b.
Fig. 6.
Fig. 7.

RADAR CONTOUR EDGE RESTORE CIRCUIT

BACKGROUND OF THE INVENTION

Conventional analog weather radar units carried in airships have for many years featured an iso-contour mode. In this mode, clouds of the type which are likely to contain a strong windshear (storm clouds) are displayed as a light fringe with a dark hole in the center. Such a display is accomplished by looking for radar video return signals above a certain preselected value (termed the iso-contour level) and, during the time so received, clamping the video signal passed to the display unit to a base line. The comparator device utilized to detect when the iso-contour level has been reached, in order to achieve noise immunity, creates a hysteresis which, undesirably, has the effect of allowing the leading edge of a cloud video signal to rise above the iso-contour level before cutoff of the video signal to the display occurs, while not turning the video signal back on until the signal has often dropped well below the iso-contour level.

With conventional direct storage tube display devices, such hysteresis provided little or no perceived display deficiency. The lack of deficiency is due to the phosphor persistance on the tube and resulting frame-to-frame integration possible with a continuum of intensity levels. The only indication of any deficiency, and then only to a skilled operator, is a slight drop in intensity level at the trailing edge of the cloud. With the newer digital type indicators and resultant quantization of video signals, an erroneous display in the form of an open ended cloud presentation can occur when the radar is set to relatively greater maximum ranges. As will be brought out in greater detail in the detailed description section of the instant application, the quantization process at greater range intervals may result in the trailing edge portion of an iso-contour not being displayed.

SUMMARY OF THE INVENTION

In a weather radar of the type providing an iso-contour feature in which only the outline of certain forms are displayed in response to radar returns by sampling the radar returns at a given period to integrate the radar returns into $n$ different light levels, and, for radar returns where below some given value, a unique one of said light levels is displayed, a correction circuitry produces a signal pulse indicating that the radar returns have exceeded the given value for a time less than said period. The circuitry includes means responsive to the signal pulse for altering the display to some level other than the unique light level.

BRIEF DESCRIPTION OF THE DRAWING

FIG. 1 is a weather radar in clock diagram form of the digital display type which includes a preferred embodiment of the instant invention;

FIGS. 2a, 2b and 2c are waveforms useful in understanding the operation of the apparatus of FIG. 1;

FIG. 3 is a waveform of the clock output of FIG. 1;

FIGS. 4a and 4b are displays in schematic form without and with, respectively, the presence of the instant invention;

FIG. 5 is an exemplary level alteration circuit useful in understanding the apparatus of FIG. 1;

FIG. 6 is a truth table describing the circuit of FIG. 5; and

FIG. 7 is a table illustrating the binary codes assumed to be used through the digital portions of the circuit of FIG. 1 and equivalent video levels.

DETAILED DESCRIPTION

Referring now to FIG. 1, which illustrates in very basic form a weather radar, a pivotable radar antenna 10 of conventional design is coupled to a receivertransmitter (R/T) 12. R/T 12 is of conventional design. One such R/T is the R/T portion of an RCA Corporation model AVQ 30 weather radar which is commercially available.

R/T 12 has circuitry for: 1. directing antenna 10 to successive incremental angular steps; 2. at each step producing a radar output pulse; and 3. receiving, detecting and amplifying the return signal, all as is known to those skilled in the radar art.

FIG. 2a illustrates a typical output signal from R/T 12 (plotted as voltage versus time, which is directly related to voltage versus distance since there is a direct relationship between time and distance) at a given antenna 10 setting with a storm cloud present. It should be noted that the encircled numbers at various points in FIG. 1 refer to associated waveforms and illustrations in FIGS. 2, 3 and 4.

R/T 12 has a selectable iso-contour feature which permits the display of only fringes of clouds having voltage levels above some given value, termed the "iso-contour level". With the iso-contour feature energized, FIG. 2b represents the idealized output voltage of R/T 12. Note that the voltages of FIGS. 2a and 2b are identical except that portions of the signal which would be above the iso-contour level are clamped back to the base level.

In fact FIG. 2c, not FIG. 2b, represents the actual output voltage from R/T 12 in iso-contour mode, because R/T 12 utilizes a comparator to determine that the radar video signal has gone first above then below the iso-contour level. The comparator creates a time delay and voltage hysteresis for the purpose of improving noise immunity. However as a result of the delay and hysteresis, the video signal is not clamped to the base line until it has risen above the iso-contour level by the amount which corresponds to the amount of delay and hysteresis in the comparator circuit. This delay and hysteresis is legended D in FIG. 2c. The same delay and hysteresis occurs at the trailing edge of the iso-contour level such that, when the delay and hysteresis expires, a signal value may have dropped considerably as illustrated at waveform portion 20 in FIG. 2c.

The delay and hysteresis (and resulting trailing edge video signal truncation) is acceptable if a direct storage tube type display is utilized as previously discussed. With digital storage radar units of the type illustrated in FIG. 1 to which attention is now once again directed there is a problem which will be described in more detail later on. The output terminal of R/T 12 is coupled to the input terminal of an analog-to-digital converter (A/D) 22 and to one input terminal of a comparator 24. A source 26 of clock pulses is coupled to A/D 22. FIG. 3 illustrates the output signal from clock source 26 and is shown on the same time base as are the various FIG. 2 waveforms. A/D 22 time integrates the incoming video signal from R/T 12 and produces a digital output as each pulse from clock source 26 is received. A two bit ($2^0$, $2^1$) output A/D 22 is illustrated which is capable of producing four distinct levels. An A/D with greater resolution may be utilized if desired.

FIG. 2c includes an illustration of the average video levels required to produce various output levels at A/D 22. These output levels are labeled "0", "1", "2" and "3". Thus, for example, while waveform portion 20 (FIG. 2c) rises above a 1 level between clock pulses 27 and 28, it does not average to a 1 level. Therefore, as a result of clock pulse 28, A/D 22 will produce a binary output indication at a 0 not a "1" level. The output terminals ($2^0$, $2^1$) of A/D 22 are coupled to two input terminals of a level alteration circuit 38. When an appropriate signal is present at the (C) terminal of level alteration circuit 38, the levels at its output terminals are altered from those appearing at its input terminals. Otherwise level alteration circuit 38 merely passes through signals from A/D 22.

The output terminals ($2^0$, $2^1$) of level alteration circuit 38 are coupled to a memory 40. Memory 40 is adapted to store levels for each of a plurality of ranges (128 for example) for each of a plurality of azimuth angles (128 for example) of antenna 10. The output terminal of clock source 26 is coupled to memory 40 to control the timing of its operation. The output terminals of memory 40 are coupled to a digital-to-analog circuit (D/A) 42 to be thereby converted to analog signals utilized to intensity modulate a CRT display device 44 to which D/A 42 is coupled. It will be appreciated that although an analog signal is being applied to CRT 44 it will display only $n$ different brightness levels ranging from a dark screen through various brightness levels to one brightest level. In the example illustrated, $n$ is 4. The CRT deflection circuitry, which is of conventional design, is not illustrated to avoid unnecessary detail in the drawing.

Returning to comparator 24, an adjustable terminal 48 of a variable resistor or potentiometer 50 is coupled to the second input terminal of comparator 24. Potentiometer 50 is coupled to a source of reference potential, V, where V is at least equal to the 1 or 2 level illustrated in FIG. 2c for reasons to be described shortly. The output terminal of comparator 24 is coupled to the set (S) input terminal of a one bit memory device such as a flip-flop 52. The Q output terminal of flip-flop 52 is coupled to the control (C) input terminal of level alteration circuit 38. Potentiometer 50 is set so that comparator 24 produces a pulse to set flip-flop 52 whenever the video signal, FIG. 2c, exceeds the voltage on potentiometer arm 48. Typically, though not necessarily, this will be set to a 1 level.

One form of level alteration circuit is illustrated in FIG. 5 to which attention is now directed. Conductor 84 carrying the $2^1$ bit level is coupled directly through the level alteration circuit 38 and to an inverting input terminal of an AND gate 86. The (C) input terminal of level alteration circuit 38 is coupled to the second input terminal of AND gate 86. Conductor 88 carrying the $2^0$ bit level is coupled to one input of an OR gate 90. The output terminal of AND gate 86 is coupled to the second input terminal of OR gate 90. The output of OR gate 90 is applied to the $2^0$ bit output terminal of the circuit 38. FIG. 6 represents the truth table of FIG. 5. Essentially when flip-flop 52 is not set ( (Q) = logic 0), the input and output values of the level alteration circuit are identical. When flip-flop 52 is set ( (Q) = logic 1), the input and output values of the level alteration circuit 38 are also identical except for an input binary code $2^1$ = 0 and $2^0$ = 0 (from FIG. 7 note that this is equivalent to a video level of 0). In that situation the output binary code is $2^1$ = 0 and $2^0$ = 1 which is a video level 1 (see FIG. 7).

Operation of the apparatus of FIG. 1 will be described assuming first that the iso-contour edge restoring elements 50, 24, 52 and 38 are absent (so that A/D 22 is coupled directly to memory 40), and that the contour mode is chosen. Then, with antenna 10 set to a particular azimuth angle and following a transmitted radar "main bang" pulse, the return signal is received, detected and amplified in R/T 12 creating, at least over part of the range, the signal illustrated in FIG. 2c. It will be further assumed that the radar is set to some relatively large maximum range such as 300 miles. As a result the spacing between successive clock pulses (FIG. 3) is great relative to the size of many clouds which the radar will intercept. For example, as can be seen from a review of FIGS. 2c and 3 only the six clock pulses between the one legended 60 to and including the one legended 28 are concerned with any illustrated cloud information. The video signal FIG. 2c is digitized by A/D 22 into two bit, four level codes and stored in selected locations in memory 40. A different digit is stored for each clock pulse from clock source 26. At the same time, but not normally at the same rate that data is being stored in memory 40 it is being removed, converted back to analog form and displayed on CRT 44.

FIG. 4a illustrates the display of a radar line of information corresponding to the particular azimuth and range region illustrated in FIG. 2c. Thus as a result of a pulse 60 a level 0 is stored and displayed as illustrated in block 70. (A legend appearing to the right of FIG. 2c correlates levels with what is illustrated in FIGS. 4a and 4b). As a result of pulse 61, a 1 level is stored and later displayed as at 71. Note that while the waveform of FIG. 2c is below the 1 level when pulse 60 occurs it is above the 1 level when pulse 61 occurs such that the integrated value of waveform 2c between pulses 60 and 61 is a 1 level. Similarly pulse 62 causes a 2 level to be stored and then digitized as at 72. Pulse 63 causes a 3 level to be stored and later displayed. Pulses 64 and 27 in the contour region cause 0 levels to be stored and displayed as at 74 and 77 respectively. As mentioned previously waveform portion 20 causes a 0 level to be produced by A/D 22 and in the assumed situation this level will be stored in memory 40 and displayed as at 78. Similarly as a result of pulse 69 a 0 level is stored and displayed as at 79. Thus it is not possible to determine from an inspection of the digitally displayed pattern on CRT 44 just where the trailing edge of the cloud is located.

The addition of iso-contour edge restoring elements 50, 24, 52 and 38 corrects this problem and will now be discussed. With the addition of these elements operation is as described previously except that comparator 24 is constantly monitoring the analog video signal produced by R/T 12. When that signal rises above the value set by terminal 48, typically a 1 level, comparator 24 produces an output signal to set flip-flop 52. The flip-flop is reset as a result of each clock pulse from clock source 26. Whenever flip-flop 52 is set, level alteration circuit 38 is primed (see AND gate 86, FIG. 5). Then when A/D 22 produces a 0 level, level alteration circuit 38 converts the signal to a 1 level. From a review of FIGS. 2c and 3 it will be noted that this condition occurs at pulse 28, the pulse which monitors video signal portion 20. When flip-flop 52 is set, the resulting pulse at level alteration circuit 38 causes that circuit to be enabled forcing its output to some higher level than the 0 level which would otherwise be placed in memory 40. A 1 level may be chosen for example as will be produced by the circuit of FIG. 5 emphasizing the trailing edge location of the cloud. If greater emphasis is required a 2 level may be chosen by appropriate modification of the FIG. 5 circuit.

FIG. 4b illustrates the same display as FIG. 4a except that the iso-contour edge restoring circuit has caused the production of a 1 level alteration circuit 38 to emphasize the iso-contour.

What is claimed is:

1. In a weather radar of the type providing an iso-contour feature in which only the outline of certain forms are displayed in response to radar returns by sampling said radar returns at a given period to integrate said radar returns into $n$ different light levels for display and where for some sampled radar returnes below some given value a unique one of said $n$ light levels is displayed, the improvement comprising:

means responsive to said radar returns exceeding said given value for a time less than said period for producing a signal pulse; and means responsive to said signal pulse altering the display to one of the $n$ levels other than said unique level.

2. The combination as set forth in claim 1 wherein said means responsive to said radar returns comprises a comparator adjustable to produce an output pulse when said radar returns exceed given value.

3. The combination as set forth in claim 2 further including memory means responsive to said pulse for storing an indication of the presence thereof and wherein said altering means is responsive to said memory being in a pulse indicating state for performing said alteration.

4. The combination as set forth in claim 1 further including an analog-to-digital converter for integrating said radar returns into $n$ different digital signal values, and means for storing said digital signal values as a frame of information to be displayed, said altering means being coupled between said converter and said storing means and responsive to said pulse to alter said digital signal values to thereby alter the display to said one of the $n$ light levels other than said unique light level.

* * * * *